United States Patent [19]
Oeltjen et al.

[11] Patent Number: 5,989,385
[45] Date of Patent: Nov. 23, 1999

[54] POLYAMIDE ADHESIVES HAVING IMPROVED BOOKBINDING CHARACTERISTICS

[75] Inventors: Susan T. Oeltjen, Lake Elmo; David B. Malcolm, Maplewood, both of Minn.

[73] Assignee: H.B. Fuller Licensing & Financing, Inc, St. Paul, Minn.

[21] Appl. No.: 08/815,045

[22] Filed: Mar. 14, 1997

Related U.S. Application Data

[63] Continuation-in-part of application No. 08/616,853, Mar. 15, 1996, abandoned.

[51] Int. Cl.$^6$ ......................................................... C09J 4/00
[52] U.S. Cl. .................................... 156/330.9; 156/331.8; 412/4; 412/5; 524/285; 524/292; 525/183
[58] Field of Search ............................... 156/330.9, 331.8; 524/285, 292; 525/183; 412/4, 5

[56] References Cited

U.S. PATENT DOCUMENTS

| | | | |
|---|---|---|---|
| 2,612,463 | 9/1952 | Brown | 156/315 |
| 3,626,026 | 12/1971 | Fukumura et al. | 525/183 |
| 3,646,154 | 2/1972 | Marans et al. | 525/183 |
| 4,018,733 | 4/1977 | Lopez et al. | |
| 4,132,690 | 1/1979 | Eernstman et al. | 525/183 |
| 4,409,373 | 10/1983 | Wiemers et al. | |
| 4,419,494 | 12/1983 | Puletti et al. | |
| 4,728,688 | 3/1988 | Tizzard et al. | |
| 4,777,238 | 10/1988 | Leoni et al. | |
| 4,791,164 | 12/1988 | Wichelhaus et al. | 525/183 |
| 4,914,162 | 4/1990 | Leoni et al. | |
| 5,026,756 | 6/1991 | Arendt. | |
| 5,091,454 | 2/1992 | Arendt et al. | |

FOREIGN PATENT DOCUMENTS

| | | |
|---|---|---|
| 633919 | 10/1993 | European Pat. Off. . |
| 678543 | 10/1995 | European Pat. Off. . |

*Primary Examiner*—John J. Gallagher
*Attorney, Agent, or Firm*—Nancy N. Quan

[57] ABSTRACT

A method of bookbinding comprising the steps of a) applying a film comprising at least one hot melt polyamide at an application temperature of between about 175° C. and about 190° C. to the backbone of a book block said film having a tensile strength greater than about 400 psi and a Young's modulus of less than about 12,000 psi and b) covering said book block having said film of polyamide with a book cover having a portion thereof in substantially parallel relation to said film.

15 Claims, No Drawings

POLYAMIDE ADHESIVES HAVING IMPROVED BOOKBINDING CHARACTERISTICS

CROSS-REFERENCE TO RELATED APPLICATION

This application is a Continuation-In-Part of application Ser. No. 08/616853, filed Mar. 15, 1996, now abandoned.

FIELD OF THE INVENTION

The present invention relates to a method of using a hot melt polyamide blend for bookbinding applications such as one shot and two shot bookbinding. The present invention further relates to polyamide blends particularly suitable for bookbinding having lower application temperatures and good properties.

BACKGROUND OF THE INVENTION

One shot bookbinding, which is also known in the trade as perfect binding, is the most common method by which books are bound. Using this method, the sheets or signatures which make up a book are collated or stacked and are then held in a clamp to form a book block. Adhesive is then applied to the backbone of the book block using, for example, a two or three wheel glue pot. A cover is then applied to the backbone of the book block before the adhesive is set. The backbone of the book block may be roughed or notched prior to adhesive application but this is not a uniform practice.

Two shot bookbinding is also commonly used to bind books. Using this method, the book block is initially bound using a primer adhesive. The primer is typically a water based system, but may also be a hot melt adhesive. Due to the slow drying times of water based systems, the book backbone may be passed over burners or heaters to decrease the drying time. A second adhesive known as a covering adhesive or second shot, which is usually a hot melt adhesive, is then applied using a two or three wheel glue applicator, to the book backbone. The bookbinding process is then completed using the application of capping paper, cheese cloth or crash, and kraft paper prior to application of the cover.

One shot and two shot bookbinding are used to bind a variety of things including, but not limited to, pocket books and paperback books, magazines, catalogues, telephone or other types of directories, manuals such as computer manuals, and text books.

Hot melt adhesives are used widely for one shot and for two shot bookbinding because of the rapid rate of set that can be achieved, therefore increasing the number of books that can be bound in a set amount of time. The types of hot melt adhesives most often used are based on copolymers of ethylene and block copolymers. However, with the increasing use of recycled paper and highly coated, glossy substrates, such as for high fashion magazines, increased bonding performance is often required, and such hot melts sometimes lack the ability to bond these substrates.

The heat resistance of these hot melts often do not exceed 65° C. Heat resistance refers to the temperature at which the adhesive will soften and fail, leading to separation of the cover from the backbone of the book, or separation of the sheets or the signatures from one another. Heat resistance is very important in the transportation of books in the summer months when temperatures in a transportation vehicle may be in excess of 70° C.

Another disadvantage to the use of hot melts based on copolymers of ethylene or block copolymers is that ink solvent resistance is low. Solvents from the ink will migrate through the pages to the book back where the book cover prevents further migration. The concentration of solvent at this point leads to delamination of the book cover from the book back.

This has led to the use of hot melt polyurethanes or hot melt PURs. These adhesives are also known in the industry as hot melt moisture cures. PURs are high performance adhesives with excellent adhesion to difficult substrates such as recycled paper and highly coated, glossy substrates. PURs have excellent ink solvent resistance and excellent heat resistance which often exceeds 100° C.

There are disadvantages to using PtJRs, however, such as very slow cure rates, and cost. Due to the slow cure rate, books may be shipped prior to cure. No mechanical testing may be performed on the book prior to cure. Quality control is therefore not performed, and there is no guarantee that the books will meet specification.

Binderies in which hot melts are currently being used cannot quickly change to the use of PURs because different application equipment is required. This in turn leads to high conversion costs if equipment must be purchased. PURs also have high raw material and manufacturing costs resulting in increased cost to the consumers.

For two shot bookbinding, polyurethane dispersions, which are water based systems, may be used as the primer.

Polyamides are commercially available from many sources including Henkel Kommanditgesellschaft auf Aktien located in Dusseldorf, Germany; Union Camp located in Jacksonville, Fla., and H.B. Fuller Co, a St. Paul, Minn. based company.

U.S. Pat. No. 4,419,494 to Puletti et al., issued Dec. 6, 1983, teaches the use of dimeric fatty acid based polyamides in combination with A- B-A block copolymers. The tensile strength of these products are substantially lower than those of the present invention as they are less than about 100 psi at 100% elongation at 21° C. This patent does not disclose the use of polyamides for bookbinding applications.

European Pat. No. 633,919 to Heucher et al., issued Oct. 14, 1993, discloses a dimer fatty acid based polyamide used in combination with ethylene vinyl acetate or ethylene methacrylate copolymers and styrene-ethylene-butene block copolymers and hydroabietyl alcohol or polybutene. This is distinguished from the present invention in that it requires the use of a copolymer of polyethylene and block copolymer and a plasticizer all in combination with the polyamide. The resultant properties of these adhesives are not the same as those required for bookbinding applications. This patent discloses how to use these adhesives for bonding polyethylene, PVC, and metal but does not teach how to use them for bookbinding applications. These products are therefore useful for the limited purpose of bonding these difficult materials.

U.S. Pat. No. 4,791,164 to Wichelhaus et al. issued Dec. 13, 1988, describes a compatible mixture of a terpolymer based on ethylene and a polyamide. However, this patent, as does European Pat. No. 633,919, teaches the use of these products for the limited purpose of bonding metals and polar and apolar plastics such as polypropylene or polyethylene. It does not teach how to use polyamide blends for use in bookbinding applications.

U.S. Pat. No. 4,018,733 to Lopez et al., issued Apr. 19, 1977, discloses blending polyamides with acidic ethylene polymers and tackifying agents. It again teaches how to use these blends for the limited purpose of bonding plastics such as polyethylene and metals such as lead. It does not disclose how to use these blends for bookbinding applications.

U.S. Pat. No. 5,026,756 issued Jun. 25, 1991 and U.S. Pat. No. 5,091,454 issued Feb. 25, 1992 to Arendt teach the use of 1,4-cyclohexane dimethanol dibenzoate in combination polyamides but do not teach how to use this combination for bookbinding applications.

U.S. Pat. No. 4,409,373 to Wiemers et al. issued Oct. 11, 1983, and U.S. Pat. No. 4,777,238 issued Oct. 11, 1988 and U.S. Pat No. 4,914,162 issued Apr. 3, 1990 to Leoni et al. disclose how to make polyamides but do not disclose a use for bookbinding.

U.S. Pat. No. 4,728,688 to Tizzard et al., issued Mar. 1, 1988, teaches the use of a water based primer for the first adhesive, and segmented EVA copolymer or a segmented monoalkene-vinyl acetate copolymer and a tackifying resin as the second adhesive for two shot bookbinding but does not teach the use of polyamide blends for two shot bookbinding.

Typical hotmelt polyamide adhesives have not been used as bookbinding adhesives due to poor heat stability. Typically, hot melt polyamides have to be applied above 200° C. because of their high melt points and high viscosities. These very high application temperatures cause the polyamides to degrade and prevents their use in bookbinding applications. The degradation of polyamides results in char. Char causes uneven application of the hot melt polyamide to the book which results in poor adhesion at certain points. Also, hot melt polyamide adhesives typically have low elongation values which prevent good lay flat characteristics for books. Lay flat refers to the ability of books to remain open when no pressure is applied such as from a hand.

Surprisingly, the current inventors have found that by blending hot melt polyamides, or by blending other polymers, tackifiers, or plasticizers with hot melt polyamides, the properties required for bookbinding applications can be achieved. These blends lead to better specific adhesion which is required for UV coated paper, glossy coated paper, or recycled paper. By blending polyamides with other materials, lower viscosities can be obtained requiring a lower temperature of application which improves pot stability. The problem with degradation of polyamides therefore is eliminated. Higher elongation values are obtained which is required for good lay flat. Hot melt polyamide blends have a fast set time which allows for quality control testing prior to shipment, assuring that books are meeting required specifications. The heat resistance of hot melt polyamide blends may exceed 95° C. which is much higher than that of hot melts based on copolymers of polyethylene or hot melts based on block copolymers.

Standard hot melt application equipment may be used to apply hot melt polyamide blends so the conversion costs realized with the use of PURs is not a factor.

SUMMARY OF THE INVENTION

A method of bookbinding comprising the steps of:
applying a film comprising at least one hot melt polyamide at an application temperature of between about 175° C. and about 190° C. to the backbone of a book block and covering the book block having the film of hot melt polyamide with a book cover wherein a portion of the book cover is in substantially parallel relation to the film.

The film of hot melt polyamide adhesive has a tensile strength of greater than about 400 psi and a Young's Modulus of less than about 12,000 psi.

The hot melt polyamide blend is between the book block and the book cover and substantially adheres the sheets of the book which form signatures, the book block and book cover to one another.

The present invention further discloses a polyamide blend hot melt adhesive suitable for book binding comprising:

I. A hot melt adhesive for use in book binding comprising from about 50% to about 70% by weight of a polyamide based on dimer fatty acid; from about 10% to about 30% by weight of a tackifying resin selected from the group of rosins and rosin derivatives; and terpenes and modified terpenes; and aliphatic and cycloaliphatic and aromatic hydrocarbons and hydrogenated derivatives; and mixtures thereof; from about 10% to about 30% by weight of an ethylene vinyl acetate copolymer containing from about 25% to about 40% by weight vinyl acetate and having a melt index greater than about 40 g/10 min.

II. A hot melt adhesive for use in bookbinding comprising from about 70% to about 95% by weight of a polyamide based on dimer fatty acid;
and from about 5% to about 30% by weight of 1,4-cyclohexane dimethanol dibenzoate, wherein said hot melt adhesive can be used at an application temperature of from about 175° C. to about 190° C. with minimal degradation.

The hot melt polyamide blends are further characterized by elongation values of greater than about 350% and preferably greater than about 500%, and tensile strengths of greater than about 400 psi and preferably greater than about 800 psi, and Young's Moduli of less than about 12,000 psi and preferably less than about 10,000 psi. The books thus formed by a one shot or by a two shot bookbinding method have good lay flat characteristics.

Surprisingly, the hot melt polyamide blends can be applied at temperatures of about 175° C. to about 190° C. with reduced degradation.

DETAILED DESCRIPTIONS

The hot melt polyamide blend comprises or consists essentially of at least one polyamide. This polyamide is present in amounts from about 20 to about 100 percent by weight, preferably from about 40 to about 100 percent by weight, more preferably from about 60 to about 100 percent by weight, and most preferably from about 80 to about 100 percent by weight. These polyamides may be based on dimer fatty acid, or other fatty acids. Such polyamides are available from Henkel Kommanditgesellschaft auf Aktien located in Dusseldorf, Germany; from Union Camp located in Jacksonville, Fla.; and from H.B. Fuller Co. located in St. Paul, Minn. The preferred polyamides are HM-1580, HM-1525, HM-0652, and HL-6527-X available from the H.B. Fuller Co. One skilled in the art will recognize that there are many different grades of polyamides available and will select those with the desired physical properties.

The tackifying resins useful herein are selected from the group consisting of rosins and rosin derivatives; and terpenes and modified terpenes; and aliphatic and cycloaliphatic and aromatic hydrocarbon resins and hydrogenated derivatives; and mixtures thereof. Such tackifying resins typically have a Ring and Ball softening point of between about 70° C. and about 150° C., however, some are available in lower softening point versions, and even in liquid form. Useful resins include Nirez™ V-2040, a phenolic modified terpene available from Arizona Chemical Co. located in Panama City, Fla.; Sylvatac™ 1103 available from Arizona Chemical Co., Unitac™ R-100 Light available from Union Camp Corp. located in Jacksonville, Fla., Permalyn™ 305 available from Hercules in Wilmington, Del. which are all pentaerythritol rosin esters; Eastotac™ H-100 and H-130 available from Eastman Chemical Co. in Kingsport, Tenn. which is a partially hydrogenated cycloaliphatic petroleum hydrocarbon resin; Wingtack™ Extra available from Goodyear Chemical Co. in Akron, Ohio which is a partially hydrogenated cycloaliphatic petroleum hydrocarbon resin; Hercolite™ 2100 available from Hercules which is a partially hydrogenated cycloaliphatic petroleum hydrocarbon resin; Zonatac™ 105 Lite available from Arizona Chemical Co. which is a styrenated terpene hydrocarbon resin made from d-limonene; Escorez™ 5300 available from Exxon Chemical Co. located in Houston, Tex. which is a partially hydrogenated cylcoaliphatic hydrocarbon resin. The tackifying resin is present up to about 40 percent, preferably from about 10 to about 40 percent, more preferably from about 10 to about 30 percent, and most preferably from about 15 to about 30 percent.

The copolymers useful herein are copolymers of ethylene. The ethylene vinyl acetate copolymers useful herein are those containing from about 10 to about 50 percent by weight vinyl acetate monomer, and preferably from about 25 to about 40 percent by weight vinyl acetate monomer; and having a melt index greater than about 5 g/10min., and preferably a melt index of greater than about 40 g/10 min. The preferred copolymers are Elvax™ 40 and Elvax™ 150 available from DuPont Chemical Co. in Wilmington, Del. There are a variety of other grades of ethylene vinyl acetate copolymers available from DuPont, from Quantum Chemical Corp. in Rolling Meadows, Ill., and from AT Polymers and Film, Inc. in Charlotte, N.C. The copolymers are present up to about 60% by weight, preferably from about 10 to about 40% by weight, more preferably from about 10 to about 30% by weight, and most preferably from about 15 to about 30% by weight.

The solid plasticizers useful herein are selected from the group consisting of benzoate plasticizers and are available from Van Waters and Rogers, in Twinsburg, OH and Velsicol Chemical Co. in Rosemont, Ill. One skilled in the art would recognize that there are many different grades of benzoate plasticizers available for use. Some examples include 1,4-cyclohexane dimethanol dibenzoate available under the trade name of Benzoflex™ 352; Benzoflex™ S-404 which is a glyceryl tribenzoate; Benzoflex™ S-552 which is a pentaerythritol tetrabenzoate all available from Velsicol Chemical Co. Morflex™ 150, which is a dicyclohexyl phthalate plasticizer available from Morflex Inc. located in Greensboro, N.C. may also be used.

A stabilizer or antioxidant may also be used in the hot melt polyamide blends. These compounds are added to protect the adhesive from degradation caused by reaction with oxygen induced by such things as heat, light, or residual catalyst from the raw materials such as the tackifying resin. Such antioxidants are commercially available from Ciba-Geigy, Hawthorne, N.Y., and include Irganox™ 1010 and Irganox™ 1076 which are hindered phenols. These are primary antioxidants which act as radical scavengers and may be used alone or in combination with other antioxidants such as phosphite antioxidants like Irgafox™ 168 available from Ciba-Geigy. Phosphite antioxidants are considered secondary antioxidants and are not generally used alone. These are primarily used as peroxide decomposers. Other available catalysts are CyanoxTm LTDP available from American Cyanamide, Stamford, Conn. and Ethanox™ 1330 available from Albemarle, Baton Rouge, La. Many such antioxidants are available either to be used alone or in combination with other such antioxidants. These compounds are added to the hot melts in small amounts and have no effect on the other physical properties. Other compounds that could be added that also do not affect physical properties are pigments which add color, or fluorescing agents, to mention only a couple. Additives like these are known to those skilled in the art.

Additional additives that are useful to the present invention in amounts of less than about 10% are fatty amide waxes such as Kenamide™ W-40 or oxidized Fischer-Tropsch waxes such as Paraflint™ A-3 or Paraflint™ A-28. This increases the rate of set of the polyamide blend and allows it to be used on higher speed binderies without significantly reducing adhesion. Ethylene bis-amides are available from Witco located in Memphis, Tenn. under the trade name of Kenamide™. Various grades are available. This invention contemplates the use of other functionalized waxes, including, but not limited to, oxidized polyethylenes.

The adhesives are prepared by blending the components in the melt at temperatures of between about 170° C. and 200° C. until a homogeneous mixture is obtained. Various methods of blending are used in the adhesive industry and any method that works is satisfactory.

The resulting adhesives are characterized by tensile strengths of greater than about 400 psi, and preferably greater than about 800 psi; elongation values of greater than about 350%, and preferably greater than about 500%; Young's Moduli of less than about 12,000 psi, and preferably less than about 10,000 psi, and most preferably less than about 6,000 psi; programmed peel values of greater than about 65° C.; programmed shear values of greater than about 85° C.; cold crack values of less than about 2° C., and preferably less than about −4° C.; and viscosities of less than about 22,000 cPs at about 175° C., and preferably less than about 10,000 cPs at about 175° C. These adhesives are ideal for use in one shot and two shot bookbinding applications. The resulting books show excellent lay flat characteristics.

Surprisingly, the hot melt polyamide blends can be applied at temperatures of about 175° C. to about 190° C., with reduced degradation. The high application temperatures, about 200° C., typically associated with hot melt polyamides may prevent their use in standard hot melt application equipment. Degradation of the hot melt polyamide occurs at the high temperatures resulting in char. Char will result in uneven coverage of the hot melt on the book which in turn results in lack of adhesion in spots. Lowering the application temperatures can reduce these problems.

The hot melt application equipment most commonly used is a two or three wheel glue pot. The adhesives are applied to the books using binders manufactured by Mueller Martini, Harris, or Kolbus. One skilled in the art would recognize that there are other manufacturers of book binders, but Mueller Martini is the most commonly used equipment. Some of the model numbers that can be used are the Pony 3020, the Normbinder SC, the Normbinder SFC all manufactured by Mueller Martini located in Zofingen, Switzerland; the Systembinder KM 490 and Systembinder KM 495 manufactured by Kolbus located in Mahwah, N.J.; and UB-2, UB-3, and UB-5 binders available from Harris now owned by AM Graphics located in Cincinnati, Ohio.

The hot melt adhesive application equipment most commonly used is manufactured by Comstock-Wescott located in Cambridge, Mass. and is a two or three wheel glue pot.

These hot melt adhesives may be used for one and two shot bookbinding, gluing-off, tightbacking, lining-up, headbanding and book joint.

In one shot bookbinding, or Perfect Binding, the adhesive is applied to the back bone of the book block and the cover is then applied before the adhesive is set.

In one shot bookbinding for soft cover books, which is also known in the industry as Otabind or rep cover, the cover is attached to the book in much the same way as a traditional hardcover book. The sheets or signatures are collated or stacked and then held in a clamp to form a book block. Adhesives are applied to the backbone and lap edges of the book block. A reinforced lining is wrapped over the backbone and the cover is pressed into place and anchored by a side glue. The reinforced lining may be crepe, gauze or paper. This results in the book cover being unattached to the backbone in contrast to one shot bookbinding for hard cover books.

In two shot bookbinding, the book block is initially bound using a primer adhesive. A second adhesive known as a covering adhesive or second shot is then applied to the book backbone. The polyamide adhesive of the present invention can be used for both of these operations.

In hard cover books the bookbinding process may be completed using the application of capping paper, cheese cloth or crash, and then kraft paper prior to application of the cover to increase strength. Headbands may also be applied to the backbone prior to application of the cover. These additional steps which include gluing-off, lining-up, tightbacking, headbanding are outlined below. These applications may require lower viscosity adhesives which may be obtained by the use of lower viscosity polyamides or by the addition of other modifiers such as waxes, solid plasticizers and tackifiers. These adhesives may require viscosities of less than 5000 cPs at 175° C., especially where extrusion methods of application are used such as for tightbacking and headbanding. Lower viscosity adhesives often have lower tensile properties and elongation than those required for one or two shot bookbinding applications.

The object of gluing-off is to cause glue to penetrate into the backbone to a limited degree between the sections of signatures, thereby strengthening the effect of sewing.

Sometimes in the bookbinding process, headbands are applied to the backbone. These are narrow bands of fabric which may be glued to the head and tail of the book backbone, or sometimes only to the head. This is usually done for decorative purposes.

Lining-up is the process of gluing capping paper, cheese cloth or crash to the backbone of a book after adhesive binding or sewing to improve strength or firmness of the book. Kraft paper may also be applied.

Tightbacking is the process of binding the book block and/or liner composite to the cover by means of extrusion or rolicoating the adhesive resulting in a backbone firmly adhered to the cover. This can be contrasted to a loose back cover attachment which can facilitate better lay flat at the expense of rigidity and overall strength.

Book joint is another method whereby the adhesives may be used. In this method, the book block of a hard cover book is bonded to the cover by application of beads of hot melt which adhere the book block to the cover. This method is similar to side gluing in the soft cover books. This is an extrusion method also requiring lower viscosity adhesives having viscosities of less than about 5000 cPs at about 175° C.

TABLE 1

| ADHESIVE COMPONENTS | | | | | | | |
|---|---|---|---|---|---|---|---|
| Example | 1 | 2 | 3 | 4 | 5 | 6 | 7 |
| HM-1580 | 100 | 60 | | 95 | 60 | 25 | |
| HM-1525 | | | 60 | | | | |
| HM-0652 | | | | | | | 75 |
| Sylvactac 1103 | | 20 | 20 | | 20 | | |
| EVA (40–55) | | 20 | 20 | | | | |
| EVA (33–44) | | | | | 20 | | |
| Benzoflex 352 | | | | 5 | | | |
| HI-3296X | | | | | | | 100 |

TABLE 2

| TEST DATA | | | | | | | |
|---|---|---|---|---|---|---|---|
| Example | 1 | 2 | 3 | 4 | 5 | 6 | 7 |
| Visc. @ 176.7° C. | 20,500 | 11,500 | 15,425 | 5,285 | 16,250 | 14,475 | 5000 |
| Mettler Soft Pt (° F.) | 294 | | | | 284 | 335 | 285 |
| 100 g Peel (° F.) | 227 | 163 | 188 | 187 | 171 | 228 | 192 |
| 500 g Shear (° F.) | 271 | 224 | 214 | 261 | 231 | 301 | 260 |
| Cold Crack (° F.) | 15 | 15 | 15 | 0 | 20 | 25 | 15 |
| Ult. Tensile (psi) | 700 | 533 | 760 | 550 | 704 | 1,389 | 600 |
| Elongation (%) | 770 | 895 | 630 | 600 | 695 | 456 | 500 |
| Yield Pt. (psi) | 651 | 323 | 660 | 530 | 425 | 1,811 | — |
| Young's Mod. (psi) | 4,835 | 1,364 | 6,260 | 2,290 | 2,236 | 11,217 | 4500 |
| Tensile @ 100% Elongation (psi) | 640 | 310 | 490 | 350 | 410 | 1,190 | — |

Heat stability tests were run for Example 7. No film or gel formation was seen after 96 hours. Some discoloration was seen. An approximate increase in viscosity of about 30% was seen after 96 hours. This is a substantial improvement over standard commercial hot melt polyamides.

TABLE 3

| | COMPARATIVE | |
|---|---|---|
| | NS 34-1116/A | HBF/B |
| Visc. @ 176.7° C. | 9,000 | 9,125 |
| Mettler Soft Pt. (° F.) | 207 | 222 |
| 100 g Peel (° F.) | 139 | 148 |
| 500 g Shear (° F.) | 164 | 176 |
| Cold Crack | 45 | 40 |
| Tensile (psi) | 1,890 | 2,050 |

TABLE 3-continued

| | COMPARATIVE | |
|---|---|---|
| | NS 34-1116/A | HBF/B |
| Elongation (%) | 560 | 530 |
| Yield Pt (psi) | 960 | 1,010 |

The hot melt polyamide blends of the present invention have higher heat resistance than the comparative ethylene vinyl acetate based formulas as evidenced by the higher peel and shear values. In addition, the blends of the present invention exhibit excellent tensile properties allowing them to be used for bookbinding applications where lay flat is needed. The low elongation values typically achieved with polyamides has heretofore prevented their use in bookbinding applications. The lower viscosities also allow these blends to be applied at temperatures of less than about 205° C. which is advantageous because typical polyamides must be applied at temperatures of about 205° C. where their pot stability is not good.

TABLE 4

| INK SOLVENT TESTING | | | | | |
|---|---|---|---|---|---|
| | NS 34-1116/A | HBF 5362-80-1/B | HBF = #5 5466-6-2 | HBF = #2 5466-18-1 | HBF = #3 5466-22-4 |
| Control - 50 g/in² PAFT | 151 | 158 | >200 | >200 | >200 |
| Inked - 50 g/in² | 115 | 134 | 190 | 195 | 198 |

These conventional hot melts, 34-1116 and 5362-80-1, represent products developed to be solvent resistant, and achieve superior results to those obtained with standard bookbinding hot melts.

The adhesives of the present invention show improved ink solvent resistance over conventionally used hot melts based on ethylene vinyl acetate.

We claim:

1. A method of bookbinding comprising the steps of:
   I) applying a film comprising at least one hot melt polyamide adhesive at an application temperature of between about 175° C. and 190° C. to the backbone of a book block, said adhesive consisting essentially of:
      a) from about 20% to about 100% by weight of at least one polyamide;
      b) from about 0% to about 60% by weight of a compatible tackifying resin; and
      c) from about 0% to about 40% by weight of a compatible solid plasticizer;
      d) from about 0% to about 40% by weight of a wax, wherein said film has a tensile strength greater than about 400 psi, a Young's Modulus of less than about 12,000 psi and a viscosity of less than about 22,000 cPs at about 175° C.; and
   II) covering said backbone of said book block having said film of hot melt polyamide with a book cover having a portion thereof in substantially parallel relation to said film.

2. The method of claim 1 wherein the hot melt polyamide adhesive is between the book block and the book cover and substantially adheres the sheets of the book which form signatures, the book block and the book cover to one another.

3. The method of claim 1 wherein the hot melt polyamide film has a tensile strength greater than about 800 psi.

4. The method of claim 1 wherein the hot melt polyamide film has a Young's Modulus of less than about 10,000 psi.

5. The method of claim 1 wherein the percent elongation of the hot melt polyamide film is greater than about 350%.

6. The method of claim 1 wherein the percent elongation of the hot melt polyamide film is greater than about 500%.

7. The method of claim 1 wherein at least one polyamide of the hot melt polyamide blend is based on dimer fatty acid.

8. The method of claim 1 wherein the hot melt polyamide adhesive further comprises up to 80% by weight of the adhesive of additives selected from the group consisting of thermoplastic polymers, tackifying resins, solid plasticizers and waxes.

9. The method of claim 8 wherein the thermoplastic polymer is a ethylene vinyl acetate copolymer comprising about 10% to about 50% vinyl acetate by weight in the copolymer and having a melt index of greater than about 5g/10 minutes.

10. The method of claim 8 wherein the hot melt polyamide comprises from about 5% to about 30% by weight in the adhesive of a 1,4-cyclohexane dimethanol dibenzoate solid plasticizer.

11. The method of claim 8 wherein the hot melt polyamide adhesive comprises up to about 10% of a fatty amide wax.

12. The method of claim 1 wherein the bookbinding application is selected from the group consisting of one shot or two shot bookbinding.

13. The method of claim 1 wherein the hot melt polyamide adhesive is utilized as a covering adhesive or a second shot.

14. The method of claim 1 wherein a reinforced lining is wrapped over said backbone of said book block prior to covering said book block with said book cover.

15. The method of claim 1 wherein at least an additional step selected from the group consisting of lining-up, tight-backing and headbanding is accomplished prior to covering said backbone of said book block with said book cover.

* * * * *